(12) United States Patent
James-Roxby et al.

(10) Patent No.: US 8,443,230 B1
(45) Date of Patent: May 14, 2013

(54) METHODS AND SYSTEMS WITH TRANSACTION-LEVEL LOCKSTEP

(75) Inventors: Philip B. James-Roxby, Longmont, CO (US); Ralph D. Wittig, Menlo Park, CA (US); Brendan K. Bridgford, Vienna, VA (US); Robert M. McGee, Placitas, NM (US); Richard DeFelice, Pikesville, MD (US)

(73) Assignee: Xilinx, Inc., San Jose, CA (US)

(*) Notice: Subject to any disclaimer, the term of this patent is extended or adjusted under 35 U.S.C. 154(b) by 303 days.

(21) Appl. No.: 12/969,355

(22) Filed: Dec. 15, 2010

(51) Int. Cl.
*G06F 11/00* (2006.01)

(52) U.S. Cl.
USPC .............................................. 714/11; 714/12

(58) Field of Classification Search .............. 714/11, 714/12
See application file for complete search history.

(56) References Cited

U.S. PATENT DOCUMENTS

| | | | | |
|---|---|---|---|---|
| 4,672,537 A * | 6/1987 | Katzman et al. | ................. | 714/56 |
| 5,175,847 A * | 12/1992 | Mellott | ............................ | 714/12 |
| 5,226,152 A * | 7/1993 | Klug et al. | ....................... | 714/12 |
| 5,276,823 A * | 1/1994 | Cutts et al. | ........................ | 714/11 |
| 5,615,403 A * | 3/1997 | Bissett et al. | ................... | 710/61 |
| 5,838,894 A * | 11/1998 | Horst | .............................. | 714/11 |
| 6,502,209 B1 * | 12/2002 | Bengtsson et al. | ............... | 714/35 |
| 7,669,079 B2 * | 2/2010 | Weiberle et al. | ................. | 714/10 |
| 8,266,620 B2 * | 9/2012 | Kissell | ........................... | 718/100 |
| 2005/0240811 A1 * | 10/2005 | Safford et al. | .................... | 714/11 |
| 2006/0212677 A1 * | 9/2006 | Fossum | ............................. | 712/1 |

OTHER PUBLICATIONS

U.S. Appl. No. 12/916,904, filed Nov. 1, 2010, James-Roxby et al.
Ng, Harn Hua, *PPC405 Lockstep System on ML310*, XAPP564 (v1.0.2), Jan. 29, 2007, pp. 1-13, Xilinx, Inc., San Jose, California, USA.
Nass, Rich, "Xilinx puts ARM core into its FPGAs," *EE Times*, Apr. 27, 2010, pp. 1-2, www.eetimes.com.
Taylor, Brad et al., *28nm Generation Programmable Families*, Aug. 8, 2010, pp. 1-25, available from Xilinx, Inc., San Jose, California, USA.

\* cited by examiner

*Primary Examiner* — Marc Duncan
(74) *Attorney, Agent, or Firm* — LeRoy D. Maunu (57) ABSTRACT

Methods and systems for redundant operation of a first and second processor are provided. A set of instructions is executed in parallel on the first and second processors. In response to a first access transaction for a peripheral device being issued from execution of an instruction by the first processor, the first processor suspends operation. In response to the first access transaction being a write transaction, the write transaction is not issued to the peripheral device until the second processor executes the instruction and issues a second access transaction that is equal to the write transaction. In response to the first access transaction being a read transaction, the read transaction is not issued to the peripheral device until the second processor executes the instruction.

20 Claims, 5 Drawing Sheets

METHODS AND SYSTEMS WITH TRANSACTION-LEVEL LOCKSTEP

FIELD OF THE INVENTION

One or more embodiments generally relate to redundant operation of two or more microprocessors.

BACKGROUND

Many processing systems require separate circuits that perform operations synchronized with one another. For example, in systems requiring a high degree of reliability, redundant circuits are often synchronized and operated in parallel in a lockstep manner. Lockstep is a technique used to monitor and verify the operation of a system. In typical lockstep operation, two or more processors are synchronized to the same state during system start-up. Following synchronization, the state of the two processors is identical from clock cycle to clock cycle. While processors are operating in identical states, they are said to be operating in lockstep. The processors receive identical input, and the output of each processor is monitored and compared. If a difference between the outputs of the processors is encountered, an error is detected and mitigation techniques can be employed.

One problem encountered in typical lockstep operation is the synchronization of clock signals used by two or more synchronized circuits. If synchronized circuits use separate clocks, the clocks must be synchronized to initialize the circuits to a common state. Even when driven by a common clock, generated signals may arrive at redundant components at different times due to, for example: different lengths of signal lines; material imperfections; or variations in temperature, capacitance, and intermediate devices. Even after synchronization is achieved, clock signals are not perfectly stable and will tend to drift. Along with clocks being synchronized, execution of instructions by the processors must also be synchronized.

As clock signal frequencies employed in integrated circuitry increase, it becomes more difficult to synchronize and maintain lockstep operation on a cycle-by-cycle basis. With processors operating in the gigahertz range and source oscillators operating at a fraction of the processor frequency, it is difficult to align two or more processors in lockstep. Should the processors be physically separated, silicon and board delays can compound the problem. The cycle-by-cycle lockstep operation is generally enforced with an application-specific integrated circuit (ASIC), which imposes a significant increase in hardware overhead as well as design costs.

One or more disclosed embodiments may address one or more of the above issues.

SUMMARY

In one embodiment, a method for redundant operation of a plurality of processors is provided. The plurality of processors includes at least a first processor and a second processor. The method includes executing the same set of instructions in parallel on the first and second processors. In response to a first access transaction for a peripheral device being issued from execution of an instruction by the first processor, operation of the first processor is suspended. In response to the first access transaction being a write transaction, the process waits to issue the write transaction to the peripheral device until the second processor executes the instruction and issues a second access transaction that is equal to the write transaction. In response to the first access transaction being a read transaction, the process waits to issue the read transaction to the peripheral device until the second processor executes the instruction.

In another embodiment, a computing system is provided. The computing system includes a first processor and a second processor, and the computing system is configured to execute the same set of instructions in parallel on the first and second processors. First and second buffer memories are coupled to the first and second processors, respectively. The buffer memories are configured to buffer access transactions issued by the first processor and second processor for a plurality of peripheral device addresses. The first processor is configured to suspend operation in response to execution of an instruction that issues a first access transaction to one of the peripheral device addresses. A controller circuit is coupled to the first and second buffer memories. In response to the first access transaction being a write transaction, the controller circuit waits to issue the write transaction to the peripheral device address until the second processor executes the instruction and issues a second access transaction that is equal to the write transaction. In response to the first access transaction being a read transaction, the controller circuit waits to issue the read transaction to the peripheral device address until the second processor executes the instruction.

A programmable integrated circuit (IC) is provided in another embodiment. The programmable IC includes programmable logic resources and routing resources coupled to the programmable logic resources. The programmable IC further includes a plurality of processors, which includes at least a first processor and a second processor. The first and second processors are configured to execute the same set of instructions in parallel. First and second buffer memories are coupled to the first and second processors, respectively. The buffer memories are configured to buffer access transactions issued by the first and second processors for a plurality of peripheral device addresses. The first processor is configured to suspend operation in response to execution of an instruction that issues a first access transaction to one of the peripheral device addresses. A controller circuit is coupled to the first and second buffer memories. In response to the first access transaction being a write transaction, the controller circuit waits to issue the write transaction until the second processor executes the instruction and issues a second access transaction that is equal to the write transaction. In response to the first access transaction being a read transaction, the control circuit waits to issue the read transaction until the second processor executes the instruction.

It will be appreciated that various other embodiments are set forth in the Detailed Description and Claims, which follow.

BRIEF DESCRIPTION OF THE DRAWINGS

Various aspects and advantages will become apparent upon review of the following detailed description and upon reference to the drawings, in which.

DETAILED DESCRIPTION

Lockstep operation is sometimes used in applications to implement redundant operation of two or more processors. In typical lockstep operation, states of processors are synchronized on a cycle-by-cycle basis. However, the hardware required for cycle-by-cycle synchronization can be expensive to implement. One alternative to cycle-by-cycle lockstep operation is to have processors execute identical programs with outputs of such processors being checked using software waypoints. The software is designed to ensure that the software executing on both processors is at the same waypoint before the software is allowed to continue executing. However, software waypointing may not provide a sufficient level of assurance or security for some applications because there is too large a deviation from cycle-by-cycle verification.

One or more embodiments provide a method and system for redundant operation of two or more processors without requiring expensive cycle-by-cycle synchronization. Two or more processors are operated in transaction-level lockstep. As described below, transaction-level lockstep is not as costly as a system implementing cycle-by-cycle lockstep but has a level of synchronization that is stricter than software waypointing. As used herein, transaction-level lockstep operation may be referred to as lockstep operation for ease of reference, with cycle-by-cycle lockstep operation distinguished as "true" lockstep operation.

A requirement of lockstep operation is to prevent a processor error from propagating beyond the chip boundaries. The disclosed lockstep method and system enforces this requirement by enforcing the synchronization of redundant processors whenever the processors attempt to access a peripheral device. Such access attempts, referred to as access transactions, are not allowed to proceed until the redundant processors have produced identical transactions. The processors may operate independently out of lockstep in between access transactions because the processors will be synchronized and checked for discrepancy prior to proceeding with an access transaction to an external device. In this manner, discrepancies between the processor outputs may be detected and mitigation techniques may be employed. Because, synchronization does not need to be verified and maintained on a cycle-by-cycle basis, implementation costs can be reduced. At the same time, the transaction-level lockstep allows finer-grained control than software waypoints, allowing architectures to be used in a wider range of applications.

Figure 1:
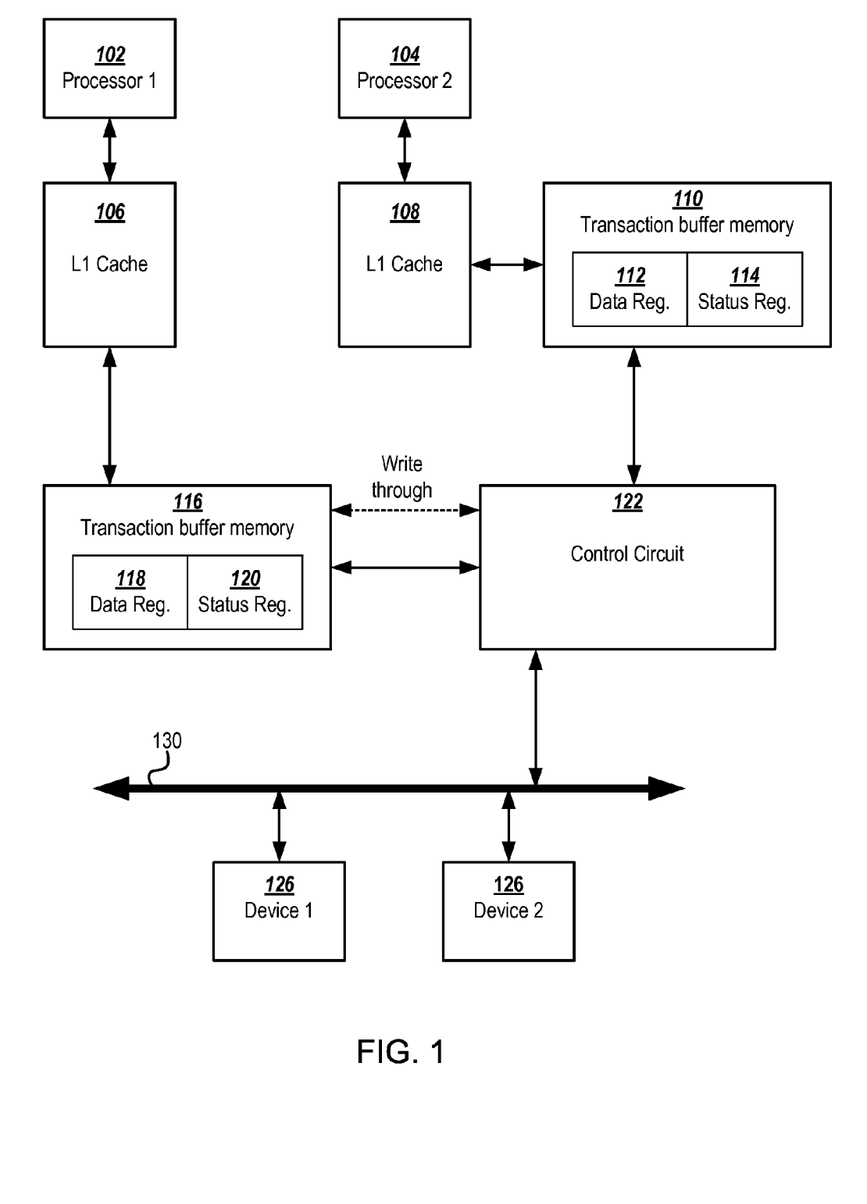
FIG. 1 shows a system-on-chip computing architecture.

FIG. 1 shows a system-on-chip (SOC) computing architecture configured in accordance with one or more embodiments. The architecture includes two processors 102 and 104, each processor having a respective L1 cache 106 and 108. In one or more implementations, the processors are configured for two modes of operation: lockstep and normal. Each processor has a memory management unit (MMU) (not shown), which allows the processors to operate with different memory configurations—one secure, and one non-secure. In normal operation, the non-secure memory configuration is used, and the processors do not perform redundant execution of code and may issue access transactions directly to external memory and non-secure peripherals.

In lockstep mode, the processors work differently. A secure memory configuration is used by each MMU. The MMU of each processor is configured to implement a buffer for access transactions to peripheral devices. A first memory 116 is used to implement the transaction buffer memory for processor 1 (102). A second memory 110 is used to implement a transaction buffer memory for processor 2 (104). The transaction buffer memories include a set of "shadow registers" for each peripheral device 126 coupled to data bus 130. Each set of shadow registers may include a data register and a status register for each peripheral device 126. Processor 1 (102) uses shadow registers 118 and 120 to access a peripheral device, and processor 2 (104) uses shadow registers 112 and 114 to access the peripheral device.

Processor 1 (102) can only access memory addresses which map to the first memory 116 and processor 2 (102) can only access memory addresses which map to the second memory 110. When issuing an access transaction for a peripheral device, the processors issue the transaction to a set of shadow registers corresponding to the destination peripheral device address. Apart from the MMU configuration, each processor runs identical programs in lockstep mode. As the processors begin execution they will naturally start to drift apart, due to different memory access times.

The shadow registers of each transaction buffer memory 110 and 116 are accessible by and may be monitored by control circuit 122 for access transactions. When identical transactions, corresponding to the same peripheral device address, are present in both transaction buffer memories, the processors are synchronized to the same executable instruction in the executing software. In response, the control circuit 122 will forward the access transaction to the corresponding one of the peripheral devices 126.

To avoid the need to continually poll the shadow registers to determine when access transactions occur, in one embodiment the control circuit is configured to detect access transactions received by one of the transaction buffer memories. In this example architecture, transaction buffer memory 116 is implemented to write-through access transactions received to the control circuit 122. Because, an access transaction must be present in each of the transaction buffer memories 116 and 110 before the access transaction is issued to the corresponding peripheral device, only one of the memories 116 and 110 needs to be monitored. Even if the second transaction buffer memory 110 is implemented in a memory that cannot be easily monitored (such as on-chip memory), the second transaction buffer memory 110 need not be polled until after an access transaction is detected in the first transaction buffer memory 116.

Figure 2:
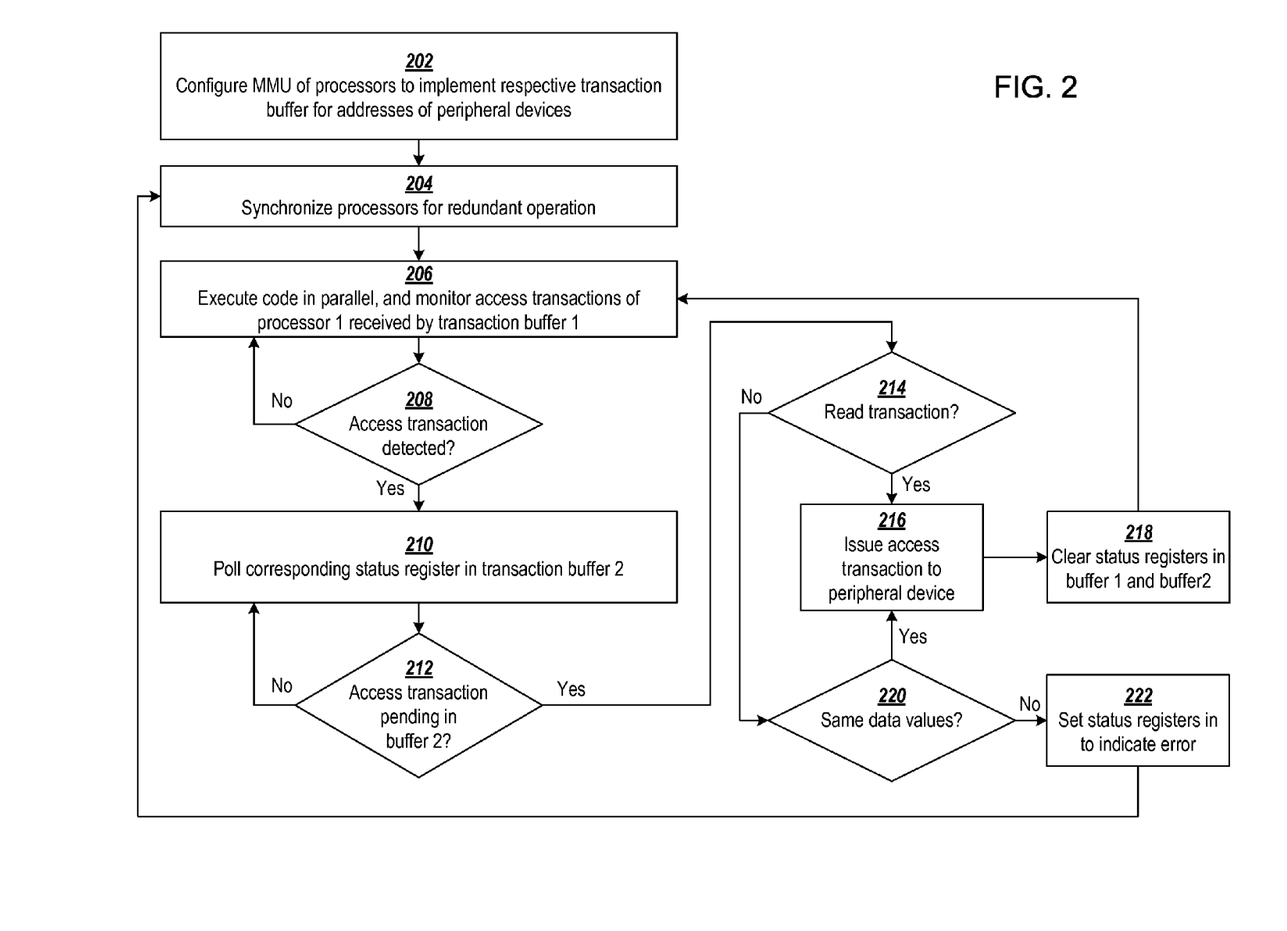
FIG. 2 shows a flowchart of a process for lockstep operation of a plurality of processors.

FIG. 2 shows a flowchart of a process for lockstep operation of a plurality of processors. As described above, the MMU of each processor is configured to access a transaction buffer memory for access transactions to addresses of peripheral devices at process block 202. The processors are synchronized for redundant operation at process block 204. At process block 206, identical application code is executed in parallel by the processors, and access transactions of one processor, for example, processor 1 (FIG. 1, 102) that are received by its transaction buffer memory (e.g., FIG. 1, 116) are monitored.

After a processor issues an access transaction to a transaction buffer memory, the processor suspends execution of further application instructions. Before suspending execution, the processor sets a status register to a pending status along with storing the access transaction in a corresponding data register of the transaction buffer memory. The processor does not resume execution until the status register is cleared.

It is possible that while the processors are executing application code, an error would occur in the processing subsystem. Example errors include a soft error, such as a single event upset (SEU), or a persistent error such as a gate rupture causing a stuck at fault on a bus. The one or more embodiments ensure that the error can only affect one processor unless catastrophic failure causes the whole system to fail. Therefore, the process assumes that an error will cause the execution of one processor to deviate compared to the other. For example, an error may cause one processor to branch in the code execution but not another. The embodiments ensure that information in error has not left the chip boundary because all accessible program memory is contained on-chip.

Each processor continues to execute independently until an access transaction is detected at decision block 208. After an access transaction is detected in one transaction buffer memory (e.g., 116), the status register in the other transaction buffer memory (e.g., 110) is polled at block 210. At this point, the same access transaction may already be pending in the other transaction buffer memory. The status register in the other transaction buffer memory is repeatedly polled until it indicates that the access transaction is pending at decision block 212.

If the access transaction is a read transaction (decision block 214), the access transaction is issued to the corresponding peripheral device at process block 216. If the access transaction is a write transaction and both transactions have the same data values (decision block 220), the access transaction is issued to the corresponding peripheral device at process block 216.

After the transaction is completed, the corresponding status registers in each transaction buffer is cleared at block 218. As a result, the processors will resume execution at process block 206. However, if the access transactions have different data values (decision block 220), an error is assumed to have occurred and the status registers are set to indicate the error at block 222. The processors are then resynchronized for redundant operation at process block 204.

In this example, data values of the access transactions are compared at decision block 220 to detect errors. One skilled in the art will recognize that the access transactions can be compared and verified in a number of ways. In another example embodiment, each processor could compute a checksum on a block of data, and write this checksum to a synchronization register before proceeding on a computation using the data.

In one or more embodiments, the processors may be configured by the software executed by the processor to set status registers and suspend execution, as enforced by decision blocks 208 and 212. During compilation of the software into executable instructions, drivers for each processor can direct the compiler to insert appropriate code segments before and after each access transaction. This automated solution removes the burden from the software developer to poll and synchronize between waypoints.

Figure 3:
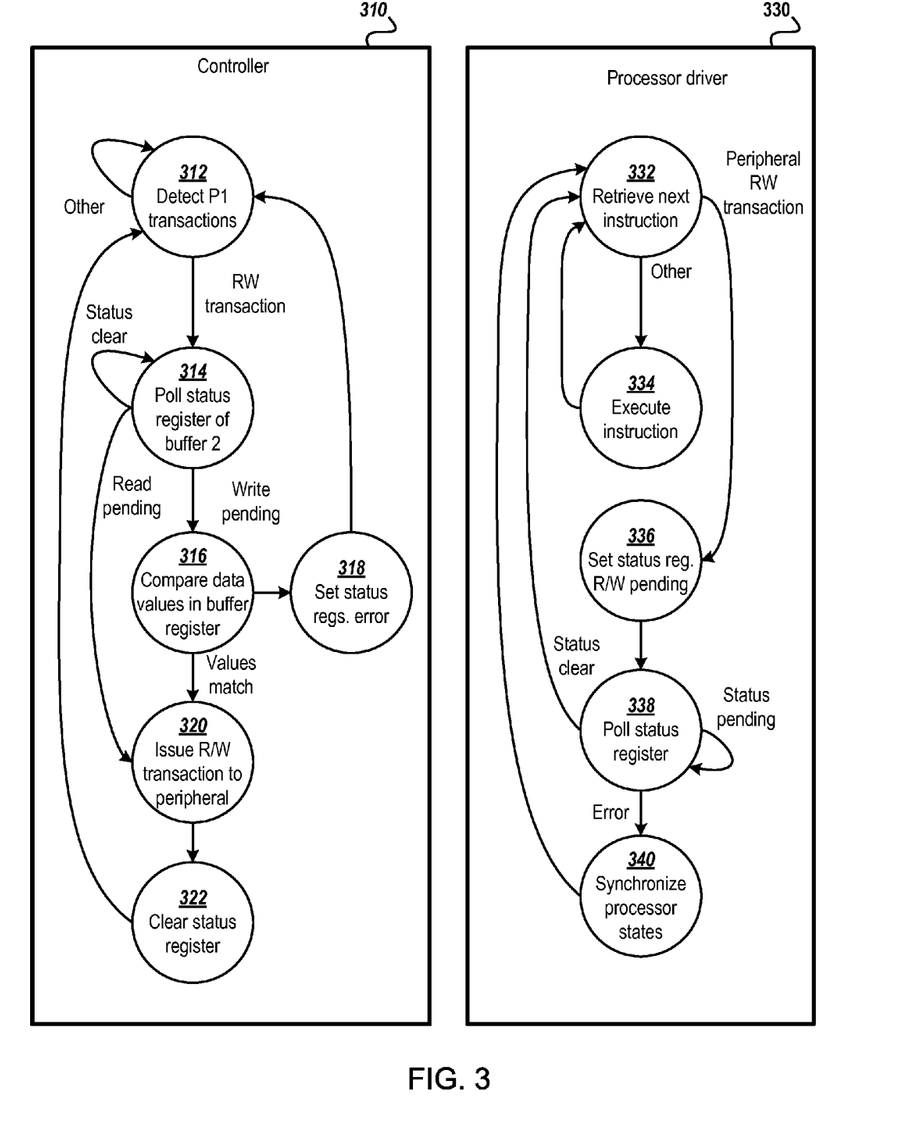
FIG. 3 shows an state diagram of an example implementation of controller and processor drivers for lockstep operation.

FIG. 3 shows a state diagram of an example implementation of the controller and processor drivers for lockstep operation. The operation of each processor is illustrated by state machine 330. The processor retrieves the next instruction at state 332. If the instruction is a peripheral read/write transaction, the processor sets the status register corresponding to the peripheral address to pending at state 336. Otherwise, the processor executes the instruction at state 334 and returns to state 332. After setting the status to pending at state 336, the processor transitions to state 338 and suspends operation. In this state, the processor repeatedly polls the status register until the pending status is cleared or an error is indicated. If the pending status is cleared, the processor transitions to state 332 and retrieves the next instruction. If the status is set to error, the processor transitions to state 340 to synchronize processor states with the other processor(s). In some implementations, there may also be a timeout associated with state 338. The timeout causes an error condition to be sent back to the processors using the shadow status registers.

The process performed by the controller is illustrated by state machine 310. Access transactions of processor 1 (P1) are detected in state 312. When a read/write access transaction issued by processor 1 is detected, the controller transitions to state 314. While in state 314, the corresponding status register in the transaction buffer (buffer 2) of the other processor is polled until the register indicates a read/write transaction is pending. In response to a read transaction, the controller transitions to state 320 and issues the read/write transaction to the corresponding peripheral device. In response to a write transaction, the controller compares data values of the data registers of the buffers in state 316. In response to a discrepancy, the controller transitions to state 318 and sets the status registers to an error status. Otherwise, the controller transitions to state 320 and issues the read/write transaction to the corresponding peripheral device. Once the transaction is issued, the controller clears the status registers in state 322 and transitions back to state 312.

Figure 4:
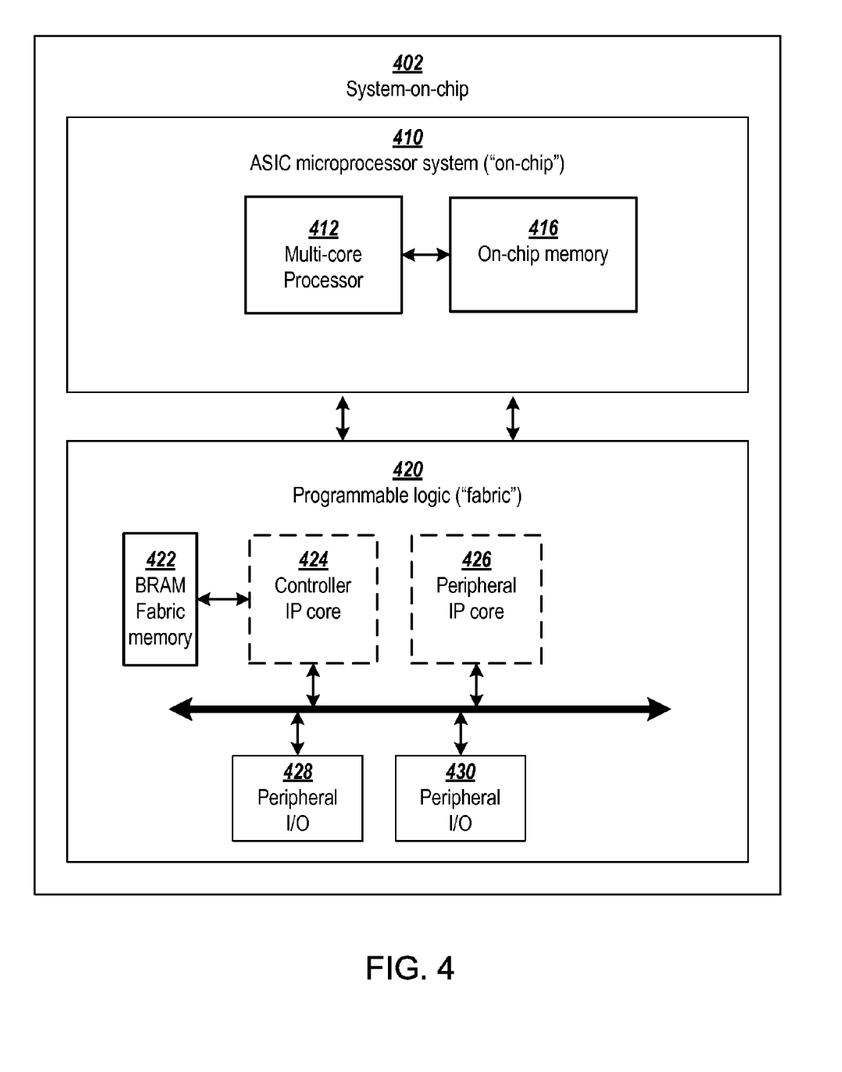
FIG. 4 shows a field programmable gate array (FPGA) implemented system-on-chip computing architecture.

One or more embodiments may be particularly suited for a system-on-chip (SOC) integrated into a programmable IC. FIG. 4 shows an FPGA-implemented SOC computing architecture configured in accordance with one or more embodiments. SOC refers to the integration of all components of a computer into a single integrated circuit chip. Recently, SOCs have increasingly been implemented in conjunction with programmable ICs to provide the capabilities and speed of programmable IC hardware with the flexibility of software development.

The SOC 402 includes an ASIC microprocessor system 410. ASIC devices implemented as part of this system may be referred to as "on-chip." The microprocessor system includes a multi-core processor 412 and an on-chip memory 416. The SOC 402 also includes programmable IC resources 420. The programmable resources may be referred to as "fabric." The programmable fabric is configured to implement a data bus and peripheral input/output transceivers 428 and 430 which may be configured for particular applications. The fabric also includes a BRAM 422 that may be utilized by circuits implemented in fabric 420.

The programmable resources of the fabric allow pre-developed blocks of logic to easily be incorporated into the system-on-chip implemented design. Such library modules include, for example, adders, multipliers, filters, and other arithmetic and digital signal processing (DSP) functions from which system designs can be readily constructed. These previously created designs may be referred to as "IP cores" (intellectual property cores). In system-on-chip architectures, an IP core 426 may be accessed by the processors as a peripheral device.

In one example embodiment, the controller may be provided as an IP core and implemented in programmable logic fabric 420. In this example, the first transaction buffer memory 116 can be implemented in the BRAM 422 and the second transaction buffer memory (FIG. 1, 110) can be implemented in the on-chip memory 416. Because the BRAM memory is located within the programmable fabric, access transactions issued by a first processor core can be made visible to the controller IP core 424 for easy detection of read/write access transactions. The processors, access transaction buffers, and processors perform as described above.

Figure 5:
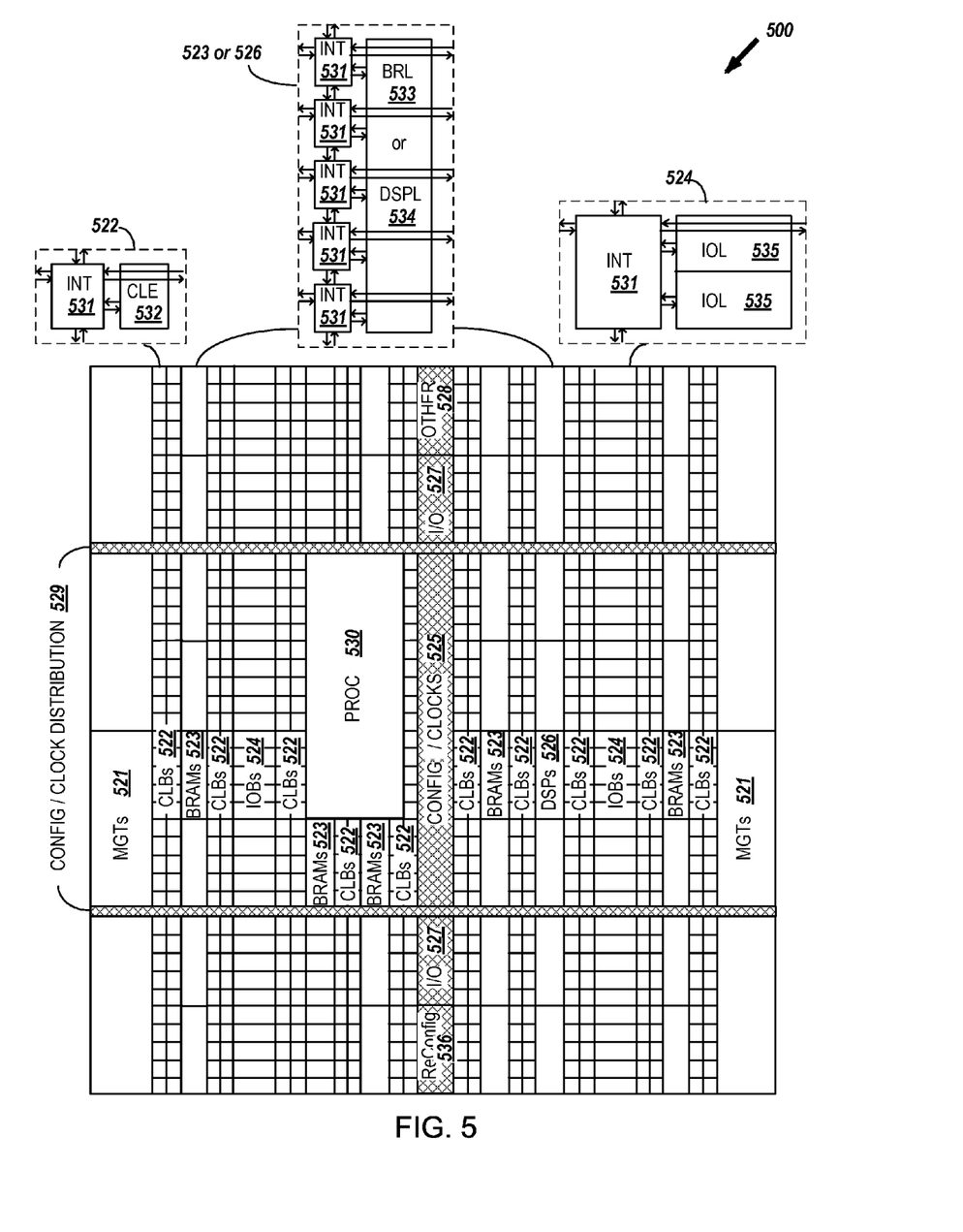
FIG. 5 shows an example FPGA architecture.

FIG. 5 is a block diagram of an example programmable integrated circuit that may be used in implementing several components, including the control circuit. The programmable IC is a field programmable gate array (FPGA). FIG. 5 is a block diagram of an example programmable integrated circuit that may implement a power distribution network. One particularly versatile programmable IC is a field programmable gate array (FPGA). FPGAs can include several different types of programmable logic blocks in the array. For example, FIG. 5 illustrates an FPGA architecture (500) that includes a large number of different programmable tiles, including multi-gigabit transceivers (MGTs 521), configurable logic blocks (CLBs 522), random access memory blocks (BRAMs 523), input/output blocks (IOBs 524), configuration and clocking logic (CONFIG/CLOCKS 525), digital signal processing blocks (DSPs 526), specialized input/output blocks (I/O 527), for example, clock ports, and other programmable logic 528 such as digital clock managers, analog-to-digital converters, system monitoring logic, and so forth. Some FPGAs also include dedicated processor blocks (PROC 530) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 522 can include a configurable logic element CLE 532 that can be programmed to implement user logic, plus a single programmable interconnect element INT 531. A BRAM 503 can include a BRAM logic element (BRL 533) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 526 can include a DSP logic element (DSPL 534) in addition to an appropriate number of programmable interconnect elements. An IOB 524 can include, for example, two instances of an input/output logic element (IOL 535) in addition to one instance of the programmable interconnect element INT 531. As will be clear to those of skill in the art, the actual I/O pads connected, for example, to the I/O logic element 535 are manufactured using metal layered above the various illustrated logic blocks, and typically are not confined to the area of the input/output logic element 535.

In the pictured embodiment, a columnar area near the center of the die (shown shaded in FIG. 5) is used for configuration, clock, and other control logic. Horizontal areas 529 extending from this column are used to distribute the clocks and configuration signals across the breadth of the FPGA. Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 530 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, in order to facilitate the efficient implementation of user logic.

The embodiments of the present invention are thought to be applicable to a variety of systems for redundant processing. Other aspects and embodiments will be apparent to those skilled in the art from consideration of the specification. The embodiments may be utilized in conjunction with application specific integrated circuit (ASIC), programmable ICs, and computing architectures. It is intended that the specification and illustrated embodiments be considered as examples only, with a true scope and spirit of the invention being indicated by the following claims.

What is claimed is:

1. A method for redundant operation of a plurality of processors, the plurality of processors including at least a first processor and a second processor, the method comprising:
   executing a same set of instructions in parallel on the first and second processors, each of the first and second processors coupled to a respective first and second status registers;
   polling only the first status register for indication of a first transaction for a peripheral device being issued from execution of an instruction by the first processor; and
   in response to the first status register indicating the first access transaction, performing steps including:
      suspending operation of the first processor;
      polling the second status register for indication of a second access transaction being issued from execution of the instruction by the second processor;
      in response to the second status register indicating the second transaction and in response to the first access transaction being a write transaction, waiting to issue the write transaction to the peripheral device until the second processor executes the instruction and issues a second access transaction that is equal to the write transaction; and
      in response to the second status register indicating the second transaction and in response to the first access transaction being a read transaction, waiting to issue the read transaction to the peripheral device until the second processor executes the instruction.

2. The method of claim 1, wherein the steps further include:
   buffering the first access transaction in a first data register of a first buffer memory;
   setting the first status register in the first buffer memory to a pending status, the setting of the first status register to the pending status causing the first processor to suspend operation;
   polling the second status register in a second buffer memory until the second status register has the pending status; and
   in response to a polled pending status from the second status register, performing steps including:
      in response to the first access transaction being a read transaction, issuing the read transaction to the peripheral device; and
      in response to the first access transaction being a write transaction and the first data register in the first buffer memory having contents equal to contents of a second data register in the second buffer memory, issuing the write transaction to the peripheral device.

3. The method of claim 2, wherein the steps further include:
   in response to the first access transaction being a write transaction and the first data register having contents different from the second data register, setting the first and second status registers to an error status.

4. The method of claim 3, wherein the steps further include, in response to the first and second status registers having the error status, re-synchronizing the first and second processors for redundant operation.

5. The method of claim 2, wherein the steps further include:
in response to the instruction executed by the second processor issuing the second access transaction for the peripheral device:
buffering the second access transaction in the second data register in the second buffer memory; and
setting the second status register in the second buffer memory to the pending status, the setting of the second status register to the pending status causing the second processor to suspend operation.

6. The method of claim 5, wherein the steps further include, causing the first and second processors to resume operation by clearing the pending status of the first and second status registers of the respective first and second buffer memories.

7. The method of claim 5, wherein the first and second buffer memories each include a status register and a corresponding data register associated with each of a plurality of peripheral device addresses.

8. The method of claim 5, wherein the first and second processors are configured to buffer access transactions in the respective first and second buffer memories only when operating in a lock-step mode.

9. The method of claim 2, wherein:
the first buffer memory is included in a processor system portion of a system-on-chip (SOC) integrated circuit; and
the second buffer memory is located within a programmable logic region of the SOC integrated circuit.

10. A computing system, comprising:
a first processor and a second processor, the computing system configured to execute a same set of instructions in parallel on the first and second processors;
first and second buffer memories coupled to the first and second processors, respectively, and configured to buffer access transactions issued by the first processor and second processor for a plurality of peripheral device addresses, the first and second buffer memories including first and second status registers;
wherein the first processor is configured to suspend operation in response to execution of an instruction that issues a first access transaction to one of the peripheral device addresses;
a controller circuit coupled to the first and second buffer memories and configured to:
poll only the first status register for indication of a first transaction for a peripheral device being issued from execution of an instruction by the first processor;
in response to the first status register indicating the first access transaction, performing steps including:
polling the second status register for indication of a second access transaction being issued from execution of the instruction by the second processor;
in response to the second status register indicating the second transaction and in response to the first access transaction being a write transaction, wait to issue the write transaction to the one of the peripheral device addresses until the second processor executes the instruction and issues a second access transaction that is equal to the write transaction; and
in response to the second status register indicating the second transaction and in response to the first access transaction being a read transaction, wait to issue the read transaction to the one of the peripheral device addresses until the second processor executes the instruction.

11. The computing system of claim 10, wherein:
each buffer memory includes a data register and a corresponding status register associated with each of the plurality of peripheral device addresses, respectively;
the first processor is further configured to:
set the status register associated with the one of the peripheral device addresses to a pending status in response to buffering an access transaction in the corresponding data register in the first buffer memory; and
suspend operation in response to the pending status in the status register in the first buffer memory and associated with the one of the peripheral device addresses;
the second processor is configured to:
set the status register associated with the one of the peripheral device addresses to a pending status in response to buffering an access transaction in the corresponding data register in the second buffer memory; and
suspend operation in response to the pending status in the status register in the second buffer memory and associated with the one of the peripheral device addresses; and
the controller circuit is further configured to:
in response to the first access transaction issued by the first processor, poll the status register of the second buffer memory and corresponding to the one of the peripheral device addresses; and
in response to a polled pending status in the status register of the second buffer memory and corresponding to the one of the peripheral device addresses, perform operations including:
in response to the first access transaction being a read transaction, issuing the read transaction to the one of the peripheral device addresses;
in response to the first access transaction being a write transaction and the data registers in the first and second buffer memories and associated with the one of the peripheral device addresses being equal, issuing the write transaction to the one of the peripheral device addresses; and
in response to the first access transaction completing, clearing the pending status of the status registers associated with the one of the peripheral device addresses.

12. The computing system of claim 11, wherein the controller circuit is further configured to, in response to the access transaction being a write transaction and the data registers associated with the one of the peripheral device addresses not being equal, set the status registers associated with the one of the peripheral device addresses in the first and second buffer memories to an error status.

13. The computing system of claim 12, wherein the computing system is further configured to, in response to the status registers of the first and second buffer memories and associated with the one of the peripheral device addresses having a value indicating an error, synchronize the first and second processors for lock-step operation.

14. The computing system of claim 11, wherein the first and second processors are further configured to resume operation in response to a cleared pending status in the status registers of the first and second buffer memories and associated with the one of the peripheral device addresses.

15. A programmable integrated circuit (IC), comprising:
programmable logic resources;
routing resources coupled to the programmable logic resources;

a plurality of processors including at least a first processor and a second processor, the first and second processors configured to execute a same set of instructions in parallel;

first and second buffer memories coupled to the first and second processors, respectively, and configured to buffer access transactions issued by the first and second processors for a plurality of peripheral device addresses, the first and second buffer memories including first and second status registers;

wherein the first processor is configured to suspend operation in response to execution of an instruction that issues a first access transaction to one of the peripheral device addresses; and a controller circuit coupled to the first and second buffer memories and configured to:

poll only the first status register for indication of a first transaction for a peripheral device being issued from execution of an instruction by the first processor;

in response to the first status register indicating the first access transaction, performing steps including:

polling the second status register for indication of a second access transaction being issued from execution of the instruction by the second processor;

in response to the second status register indicating the second transaction and in response to the first access transaction being a write transaction, wait to issue the write transaction until the second processor executes the instruction and issues a second access transaction that is equal to the write transaction; and in response to the second status register indicating the second transaction and in response to the first access transaction being a read transaction, wait to issue the read transaction until the second processor executes the instruction.

16. The programmable IC of claim 15, wherein:

the first and second buffer memories further include a data register and a corresponding status register associated with each of the plurality of peripheral device addresses, respectively; and the controller circuit is further configured to:

in response to the first access transaction issued by the first processor for the one of the peripheral device addresses, poll the status register of the second buffer memory and associated with the one of the peripheral device addresses; and in response to a polled pending status, perform steps including:

in response to the first access transaction being a read transaction, issuing the read transaction to the one of the peripheral device addresses;

in response to the first access transaction being a write transaction and the data registers in the first and second buffer memories and associated with the one of the peripheral device addresses being equal, issuing the write transaction to the one of the peripheral device addresses; and in response to the first access transaction completing, clear the pending status of the status registers associated with the one of the peripheral device addresses.

17. The programmable IC of claim 16, wherein the first processor is further configured to, in response to execution of the instruction that issues the first access transaction, set the status register associated with the one of the peripheral device addresses to a pending status.

18. The programmable IC of claim 17, wherein the control circuit is further configured to, in response to the first access transaction being a write transaction and the data registers associated with the one of the peripheral device addresses not being equal, set the status registers associated with the one of the peripheral device addresses to an error status.

19. The programmable IC of claim 17, wherein the first processor is further configured to resume operation in response to the cleared pending status in the status register associated with the one of the peripheral device addresses.

20. The programmable IC of claim 17, wherein the first and second processors are implemented in a system-on-chip embedded on the programmable IC.

* * * * *